United States Patent
Underdown et al.

(10) Patent No.: US 6,502,635 B1
(45) Date of Patent: Jan. 7, 2003

(54) SUB-SEA MEMBRANE SEPARATION SYSTEM WITH TEMPERATURE CONTROL

(75) Inventors: David R. Underdown, Conroe, TX (US); John R. Hampton, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 7 days.

(21) Appl. No.: 09/886,176

(22) Filed: Jun. 20, 2001

(51) Int. Cl.[7] .................................................. F21B 43/36
(52) U.S. Cl. ........................ 166/267; 166/357; 210/747; 210/170
(58) Field of Search ................................ 166/357, 267, 166/75.12; 210/747, 170

(56) References Cited

U.S. PATENT DOCUMENTS

| | | |
|---|---|---|
| 1,299,741 A | 4/1919 | Layne |
| 2,271,002 A | 1/1942 | Fosnaugh |
| 2,603,354 A | 7/1952 | Way et al. |
| 3,590,919 A * | 7/1971 | Talley, Jr. .................... 166/357 |
| 3,893,918 A | 7/1975 | Favret, Jr. |
| 4,171,017 A | 10/1979 | Klags |
| 4,173,533 A | 11/1979 | Williams |
| 4,241,788 A | 12/1980 | Brennan |
| 4,296,810 A | 10/1981 | Price |
| 4,411,790 A | 10/1983 | Arod et al. |
| 4,501,440 A | 2/1985 | Anderson et al. |
| 4,506,735 A * | 3/1985 | Chaudot .................... 166/357 |
| 4,595,507 A | 6/1986 | Chang et al. |
| 4,659,343 A | 4/1987 | Kelly |
| 5,117,908 A * | 6/1992 | Hofmann .................... 166/267 |
| 5,154,741 A * | 10/1992 | da Costa Filho ............ 166/357 |
| 5,176,725 A | 1/1993 | Puri et al. |
| 5,232,475 A * | 8/1993 | Jepson ....................... 166/267 |
| 5,240,073 A | 8/1993 | Bustamante et al. |
| 5,425,416 A | 6/1995 | Hammeke et al. |
| 5,439,592 A | 8/1995 | Bellos et al. |
| 5,460,227 A * | 10/1995 | Sidrim ....................... 166/267 |
| 5,673,752 A | 10/1997 | Scudder et al. |

(List continued on next page.)

FOREIGN PATENT DOCUMENTS

| | | |
|---|---|---|
| WO | WO 00/03780 | 1/2000 |
| WO | WO 00/08302 | 2/2000 |
| WO | WO 00/24493 | 5/2000 |
| WO | WO 00/58603 | 10/2000 |

OTHER PUBLICATIONS

Koros. "Membranes: Learning a Lesson from Nature." *Chemical Engineering Progress*.68–81 (1995).
Web page, www.weir.co.uk/news/1999/news–downhole.html.
Web page, www.expro.co.uk/subsurface/icms.html.
Web page, www.cheresources.com/hmembranes.shtml.

*Primary Examiner*—David Bagnell
*Assistant Examiner*—Daniel P Stephenson
(74) *Attorney, Agent, or Firm*—Richard J. Schulte

(57) ABSTRACT

A system and method for recovery of hydrocarbon gas and liquids from a sub-sea environment utilizing a sub-sea membrane separation system. The system includes a production string located in a sub-sea wellbore for removing hydrocarbons and contaminants from a sub-sea formation. At least one membrane separator for separating contaminants from hydrocarbons removed from the sub-sea formation is located underwater between the production string and a hydrocarbon collection tank such that a predetermined temperature of the hydrocarbons is obtained by the location of the membrane. In another embodiment, a tube is connected to a sub-sea production string for removing hydrocarbons and contaminants from a sub-sea wellbore. At least one membrane separator for separating contaminants from hydrocarbons in the tube is positioned between the production string and a hydrocarbon collection tank wherein the temperature of the hydrocarbons and contaminants is controlled by the location of the membrane.

43 Claims, 13 Drawing Sheets

U.S. PATENT DOCUMENTS

| | | |
|---|---|---|
| 5,693,225 A | 12/1997 | Lee |
| 5,730,871 A | 3/1998 | Kennedy et al. |
| 5,785,860 A | 7/1998 | Smith |
| 5,830,368 A | 11/1998 | Peachey |
| 5,860,476 A | 1/1999 | Kjos |
| 6,015,011 A | 1/2000 | Hunter |
| 6,017,456 A | 1/2000 | Kennedy et al. |
| 6,296,060 B1 * | 10/2001 | McCaslin .................. 166/267 |

* cited by examiner

SUB-SEA MEMBRANE SEPARATION SYSTEM WITH TEMPERATURE CONTROL

The present invention relates generally to recovery of hydrocarbon gas and liquids from a sub-sea wellbore, and, more particularly, the invention relates to technology for separation of contaminants from hydrocarbon gases and liquids utilizing a sub-sea membrane separation system with temperature control.

BACKGROUND OF THE INVENTION AND BRIEF DESCRIPTION OF THE RELATED ART

Hydrocarbon gases and liquids are recovered from underground wellbores by drilling a wellbore into a hydrocarbon gas or liquid formation and withdrawing the materials under reservoir pressure or by artificial lifting. The fluids withdrawn from the reservoir consist of a combination of hydrocarbon liquids and gases, water, sediments, and other contaminants. The water fraction is commonly referred to as produced water. This fraction, although small at the early stages of oil extraction from most fields, grows over the years and could constitute the majority (up to about 90%) of the fluid that is withdrawn from the reservoir.

The current recovery technology involves removing the hydrocarbon and any contaminants including water and sediments which are present from the wellbore, and separating the contaminants from the hydrocarbon above ground or on the ocean surface. This method of separation is costly. Disposal of the removed contaminants may also present environmental problems. The contaminants which may be produced include carbon dioxide, nitrogen, water vapor, hydrogen sulfide, helium, other trace gases, water, water soluble organics, normally occurring radioactive material and others.

Membrane technologies have been developed which separate materials by allowing the selective passage of specific materials through the membrane. One example of a membrane separation system for separating oil and water downhole is described in Price, U.S. Pat. No. 4,296,810. It is desirable to place these membrane materials downhole or on the sea floor to remove the contaminants at the sea floor level and avoid the cost-intensive process of lifting, separating, and disposing of the contaminants. However, the location of these membrane materials downhole or on the sea floor results in a number of potential difficulties including exposure of the membranes to high temperatures and harsh conditions, which are not suitable for many membrane materials.

A membrane's permeability and selectivity for hydrocarbon gases and liquids are material properties of the membrane itself, and thus these properties are ideally constant with feed pressure, flow rate and other process conditions. However, permeability and selectivity are both temperature-dependent. Accordingly, it is desirable to be able to control the temperature of the hydrocarbons and contaminants before the hydrocarbons and contaminants enter the membrane separator.

It would be desirable to provide an underwater membrane separation system in which the membrane separator is located underwater, such that the temperature of the hydrocarbons and contaminants is controlled to a predetermined temperature by the location of the membrane.

SUMMARY OF THE INVENTION

The present invention relates to a system for separating contaminants from hydrocarbons removed from a sub-sea formation. In order to prevent the degradation of the membrane material in the separation system, due to temperature, the present invention provides one or more membrane separators positioned between the production string and the hydrocarbon collection tank in a sub-sea environment wherein the temperature of the hydrocarbons and contaminants is controlled to a predetermined temperature by the location of the membrane.

According to one aspect of the present invention, an underwater membrane separation system with temperature control includes a production string located in a sub-sea wellbore for removing hydrocarbons and contaminants from a sub-sea formation, and at least one membrane separator for separating contaminants from hydrocarbons removed from the sub-sea formation, the membrane separator located underwater between the producing string and a hydrocarbon collection tank, wherein the temperature of the hydrocarbons and contaminants is controlled to a predetermined temperature by the location of the membrane.

According to another aspect of the invention, an underwater membrane separation method with temperature control includes connecting a tube to a sub-sea production string for removing hydrocarbons and contaminants from a sub-sea wellbore, and positioning at least one membrane separator for separating contaminants from hydrocarbons in a tube between the production string and a hydrocarbon collection tank wherein the temperature of the hydrocarbons and contaminants is controlled by the location of the membrane.

According to a further aspect of the invention, a method of controlling a temperature of a production stream of hydrocarbons and contaminants to prevent degradation of a preferentially selective material includes positioning the preferentially selective material underwater at a location selected to achieve a predetermined temperature of the hydrocarbons and contaminants contacting the preferentially selective material.

The present invention provides a system and method for separation of hydrocarbons and contaminants utilizing an underwater membrane separator with temperature control where, by location of the membrane separator, the temperature of the hydrocarbons and contaminants is controlled to a predetermined range optimizing performance of the membrane separator. The system and method also provide reduced downtime and improved efficiency of the membrane separation system.

BRIEF DESCRIPTION OF THE DRAWINGS

The invention will now be described in greater detail with reference to the preferred embodiments illustrated in the accompanying drawings, in which like elements bear like reference numerals, and wherein.

DETAILED DESCRIPTION OF THE PREFERRED EMBODIMENTS

Figure 1:
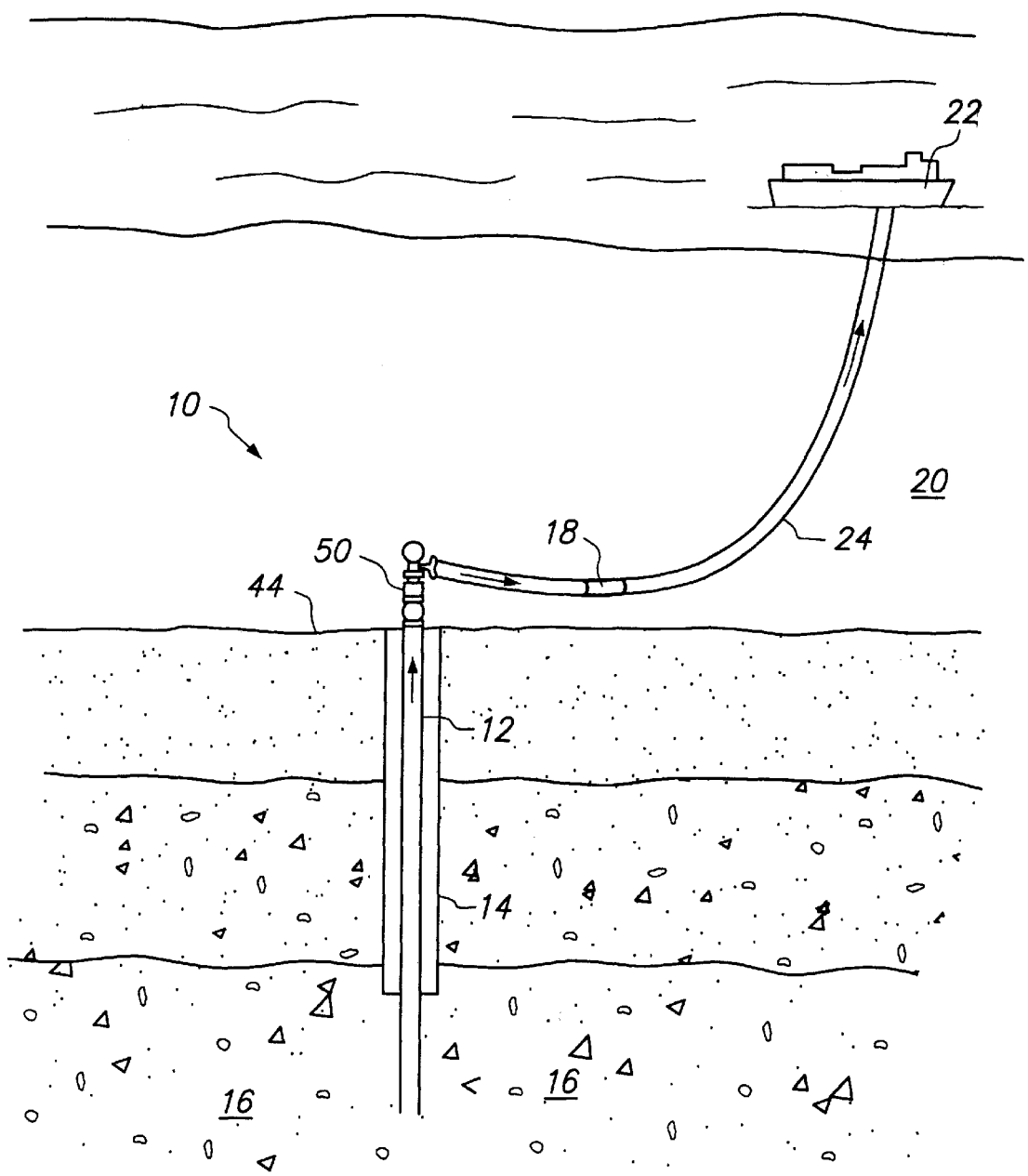
FIG. 1 is a schematic side cross-sectional view of a sea floor membrane separation system with temperature control for separating hydrocarbons and contaminants according to the present invention.

The method and system according to the present invention provide for the separation of contaminants from hydrocarbon gases and liquids in a sub-sea environment. Membrane separation systems are used for separating contaminants from hydrocarbon gases and liquids. Once the contaminants are removed from the hydrocarbon stream, the contaminants may be disposed of by injection into an underground disposal formation, removed to the surface for disposal, or released into the ocean. The release of contaminants into the ocean would only be performed when the release meets applicable local and environmental standards.

Some of the contaminants which may be removed are gases including carbon dioxide, nitrogen, water vapor, hydrogen sulfide, helium, and other trace gases, and liquids including water, and other liquids. In addition, heavy hydrocarbons may be separated from hydrocarbon gases. The hydrocarbon from which the contaminants are separated according to the present invention may be oil, methane, ethane, propane, or others.

The present technology for membrane separation primarily uses preferentially selective materials for the separation of contaminates from the hydrocarbons. Preferentially selective materials are defined as materials which are permeable to a first fluid and substantially impermeable to a second fluid. Generally, the preferentially selective materials are durable, resistant to high temperatures, and resistant to exposure to liquids. The materials may also be coated to help prevent fouling and improve durability. Examples of suitable membrane materials for removal of contaminants from a hydrocarbon gas stream include cellulose acetate, polysulfones, polyimides, cellulose triacetate (CTA), carbon molecular sieve membranes, ceramic and other inorganic membranes, composites comprising any of the above membrane materials with another polymer, composite polymer and molecular sieve membranes including polymer zeolite composite membranes, polytrimethylsilene (PTMSP), and rubbery polymers.

However, the preferred membrane materials are often subject to degradation at temperatures greater than 100° C. With the recent advances in geophysical exploration methods, oil and gas wells are being drilled deeper into the earth's crust. With the deeper wells also come higher temperatures for the hydrocarbons produced from the reservoirs. In an offshore gas well, the temperature of the gaseous mixture of hydrocarbons and contaminants can be in excess of 150° C. as the mixture exits the wellbore on the sea floor. Thus, the temperature of the hydrocarbon and contaminant mixture needs to be cooled before the mixture enters the membrane separator.

The selection of the membrane material for a gas and/or liquid separator is made on the basis of the produced hydrocarbons and contaminants. Once the hydrocarbon and contaminant mixture is identified, the material for the membrane separator is selected. The polymer membranes which are used today are selected based on the heat resistance, solvent resistance, and the mechanical strength of the porous separation membrane, as well as other factors dictated by the operating conditions for selective permeation. At the present time, most of the polymer membrane separators have a preferred operating temperature of between about 25° C. to about 100° C. Accordingly, it is highly desirable to control the temperature of the flow of hydrocarbons and contaminants before the mixture enters the membrane separator.

In addition, the permeability of gases through rubbery membranes depends upon both the gas solubility in the membrane and the diffusivity of the gas through the membrane. Diffusivity increases while solubility decreases with temperature. In general, these competing effects result in a net increase in permeability with increasing temperature. The exception occurs at very low temperatures where the increased solubility can dominate and the permeability increases with decreasing temperature.

For two or more gases, the permeability of each gas will, per rule, increase with temperature. The selectivity will change with the ratio of the individual permeability. This effect can result in increasing or decreasing selectivity with temperature, and may even result in maximum, or minimum selectivity. As a rule, however, selectivity will decrease with increasing temperature.

Furthermore, for glassy polymers, the mechanisms of solubility and diffusion are somewhat different. However, the same overall trends have been observed, with selectivity usually decreasing and permeability increasing with temperature. The examples listed reflect present membrane material technology. It can be appreciated, however, other temperatures may be preferred in the future depending on technological advances.

FIG. 1 illustrates an underwater membrane separation system 10 with temperature control for separation of hydrocarbons and contaminants. The underwater membrane separation system 10 includes a production string 12 located in a sub-sea wellbore 14 for removing hydrocarbons and contaminants from a sub-sea formation 16. The membrane separator 18 is located underwater 20 between the production string 12 and a hydrocarbon collection tank 22. The temperature of the hydrocarbons and contaminants is controlled to a predetermined temperature by the location of the membrane separator 18.

Figure 2:
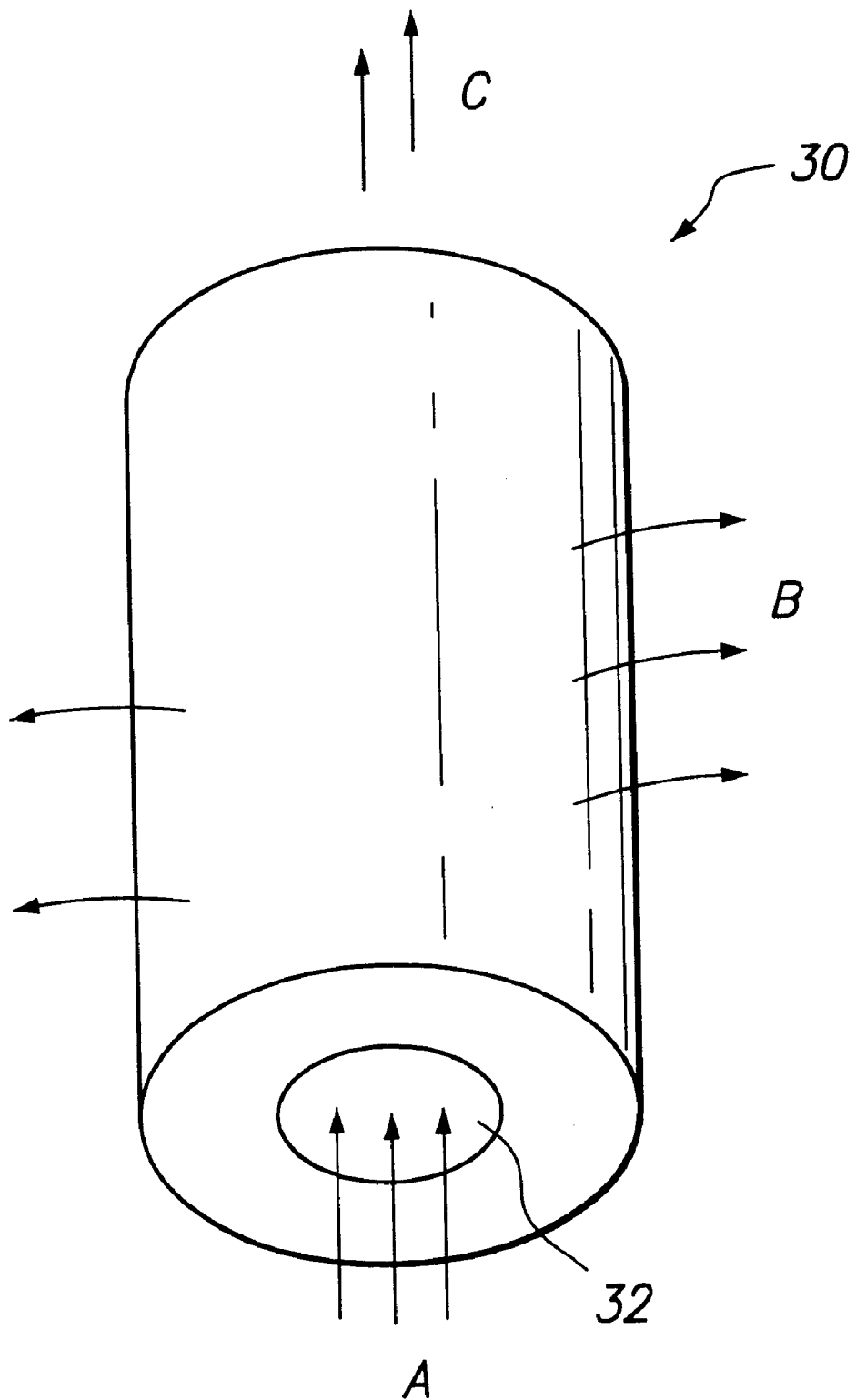
FIG. 2 is a perspective view of a membrane separator for separating contaminants from hydrocarbons for use in the system of FIG. 1.

FIG. 2 illustrates an example of a membrane element 30 formed of a preferentially selective material for permeating contaminants. The membrane element 30 is a tubular element having a central bore 32 through which the produced hydrocarbons and contaminants pass in the direction indicated by the arrows A. The contaminants permeate out through the preferentially selective material as indicated by the arrows B, and the hydrocarbons continue out of the top of the membrane element as indicated by the arrows C. One or more membrane elements 30 may be stacked within a perforated tube to form a membrane separator 18 or may be interconnected to form a membrane separator 18 in the form of a self-supporting tube. It can be appreciated, however, that other types of configurations of the separation cartridge can be used. It is common knowledge to those skilled in the art that hollow fibers, spiral wound sheets and other materials are also effective in effecting a reasonable or acceptable separation.

Each one of the stacked membrane elements 30 may be designed to permeate one or more of the contaminants which are present in the well. For example, one membrane element 30 may be designed for removal of carbon dioxide, a second for removal of hydrogen sulfide, and a third for removal of heavy hydrocarbons. The membrane elements 30 or the membrane separators 18 may be stacked in different arrangements to remove contaminants from the flow of hydrocarbons in different orders. For example, the bottom membrane elements may be those that remove water and heavy hydrocarbons which may damage some of the gas removal membrane materials. The top membrane elements may be those that remove carbon dioxide and hydrogen sulfide.

As shown in FIG. 1, the mixture of hydrocarbon and contaminants enters the sub-sea wellbore 14 from the sub-sea formation 16 and flows through the production string 12 to a wellhead 50 located on a sea floor 44. After exiting the production string 12, the hydrocarbons and contaminants will enter a flow line or tube 24 which is connected to a hydrocarbon collection tank 22. The collection tank 22 will be preferably located at or near the water surface. However, it can be appreciated that the collection tank can be located on a tanker, platform or a piece of land. As the mixture passes through an inner tube of the membrane separator 18, one or more components of the mixture permeate out of the inner tubes through the selective membrane and enters a contaminant collection zone. The membrane separator 18 is permeable to a first fluid and substantially impermeable to a second fluid.

In the present invention, the mixture of hydrocarbons and contaminants will enter the production string 12 from the sub-sea wellbore 14 and flow into at least one tube 24 on the sea floor 44. Typically, the water temperature on the sea floor 44 is between 0° C. and 10° C. As a result of the water temperature, the mixture of hydrocarbons and contaminants will experience a natural cooling process as the mixture flows through the tube 24 to the membrane separator 18. The temperature change of the hydrocarbons and contaminants is dependent on the location of the membrane separator 18 and other factors, such as the size of the tube 24, the heat-transfer properties of the tube 24, and the composition of the produced hydrocarbons. In one of the embodiments, the membrane separator 18 is located at a position where the hydrocarbons and contaminants achieve a predetermined temperature range.

As the mixture of hydrocarbon and contaminants pass through the membrane separator 18, one or more contaminants permeate out of the membrane separator through the preferentially selective material and enter the contaminant collection zone. The hydrocarbons plus any remaining contaminants which were not removed continue out the top of the membrane separator 18. The hydrocarbons with the reduced contaminants are passed to the surface or to another membrane separation system. Once the contaminants are removed from the hydrocarbon stream, the contaminants may be disposed of by injection into an underground disposal formation, removed to the surface for disposal, or released into the ocean.

Figure 3:
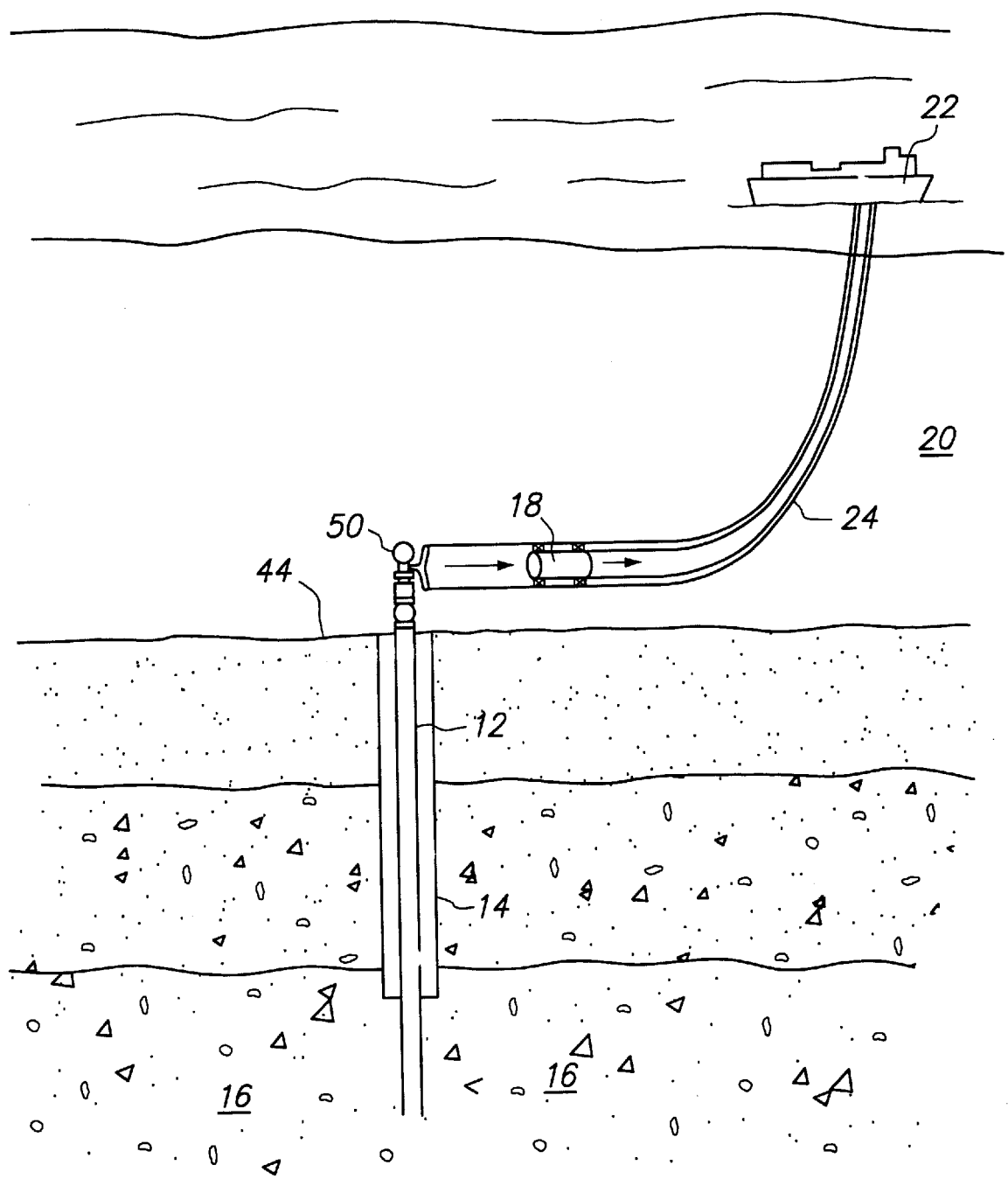
FIG. 3 is a schematic side cross-sectional view of another embodiment of a sea floor membrane separation system with temperature control showing the membrane separator within a tube according to the present invention.

FIG. 3 illustrates a further embodiment of the invention in which the membrane separator 18 is placed within a tube 24. The tube 24 is connected to a production string 12 on the sea floor 44 and to a hydrocarbon collection tank 22. The tube 24 can be made of any material that will convey the hydrocarbons and contaminants to the hydrocarbon collection tank 22, including flexible tubing for ease of replacing the membrane unit and handling of the sub-sea conditions. The location of the membrane separator 18 between the sea floor 44 and the hydrocarbon collection tank 22 results in the mixture of hydrocarbons and contaminants, achieving a predetermined temperature for separation of the hydrocarbons from the contaminants.

The tubing 24 in one subordiment is a plurality of tubes having a common center. In one of the tubes the hydrocarbons plus any remaining contaminants are conveyed to the hydrocarbon collection tank, and in a separate tube the contaminants are conveyed to the surface. It can be appreciated, however, that the tube 24 can be a single tube for only one hydrocarbon and contaminants or a series of tubes.

Figure 4:
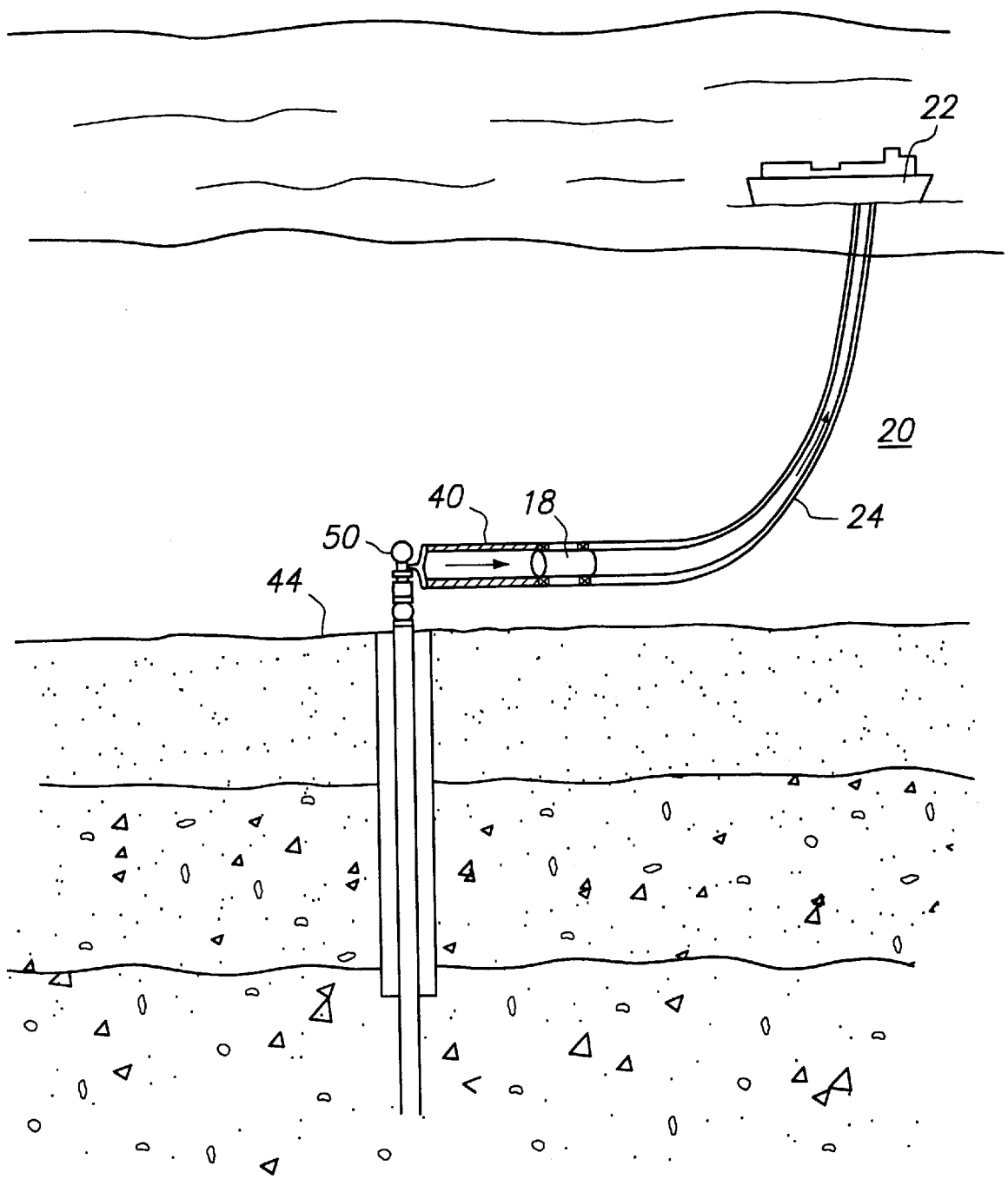
FIG. 4 is a schematic side cross-sectional view of another embodiment of a sea floor membrane separation system with temperature control showing a tube insulated with an insulating layer according to the present invention.

In another embodiment, as shown in FIG. 4, the tube 24 is insulated with an insulating layer 40. The insulating layer 40 can be made of any number of materials with the length and type of the insulation depending on the location of the membrane separator 18 and the sub-sea environment. There are several commercially available insulation materials 30 for use in sub-sea transport of hydrocarbons. These include non-jacketed and pipe-in-pipe insulation. A non-jacketed insulation is coated directly on the exterior of a pipe. Pipe-in-pipe configurations include an insulation medium in the annulus between the inner pipe (carrier) and the outer pipe (jacket). Conventional pipe-in-pipe technology uses two steel pipes fabricated together to form an annulus that is insulated by some means which may include polyurethane foam (PUF), insulating micro-spheres, or a vacuum. The insulating layer 40 and the location of the membrane separator 18 will achieve a predetermined temperature for the hydrocarbons and contaminants.

Figure 5:
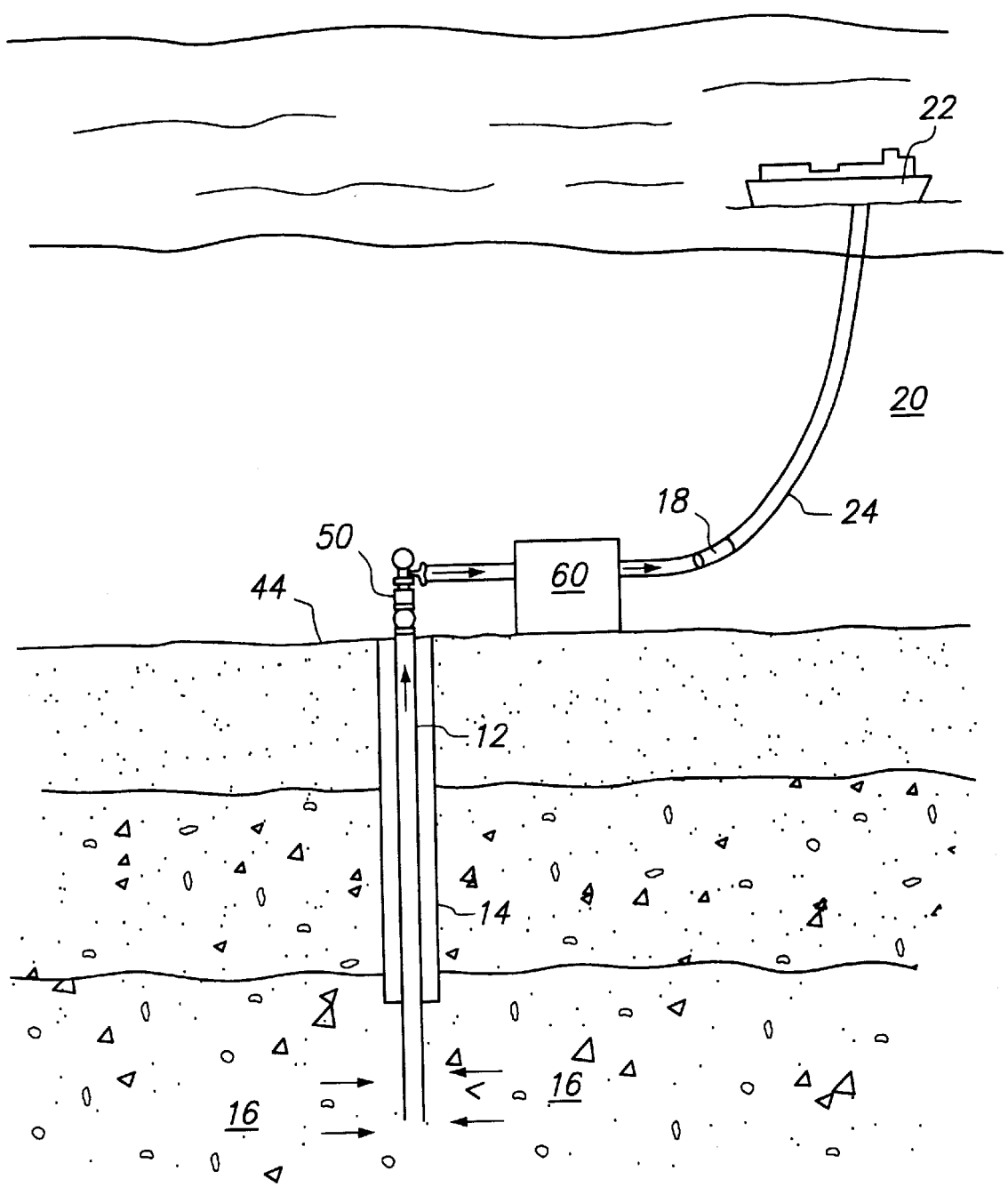
FIG. 5 is a schematic side cross-sectional view of another embodiment of a sea floor membrane separation system with temperature control showing a heat exchange element according to the present invention.

In another embodiment shown in FIG. 5, the hydrocarbon and contaminates passes through a heat-exchange element 60 before entering into the membrane separator 18. The heat-exchange element 60 may use water from the sea floor to cool the hydrocarbon and contaminants to the predetermined temperature. In addition to a heat-exchange element 60, a filter, a guard bed, a liquid/gas separator, a cyclone separator or an inverse selection membrane may be installed in the production string 12 and/or tube 24 before the membrane separator 18. As in the previous embodiments, a heat-exchange element 60 in combination with the natural cooling effect of the sea water temperature will result in the cooling of the mixture of hydrocarbons and contaminants to a desired temperature as the mixture enters the membrane separator 18.

Figure 6:
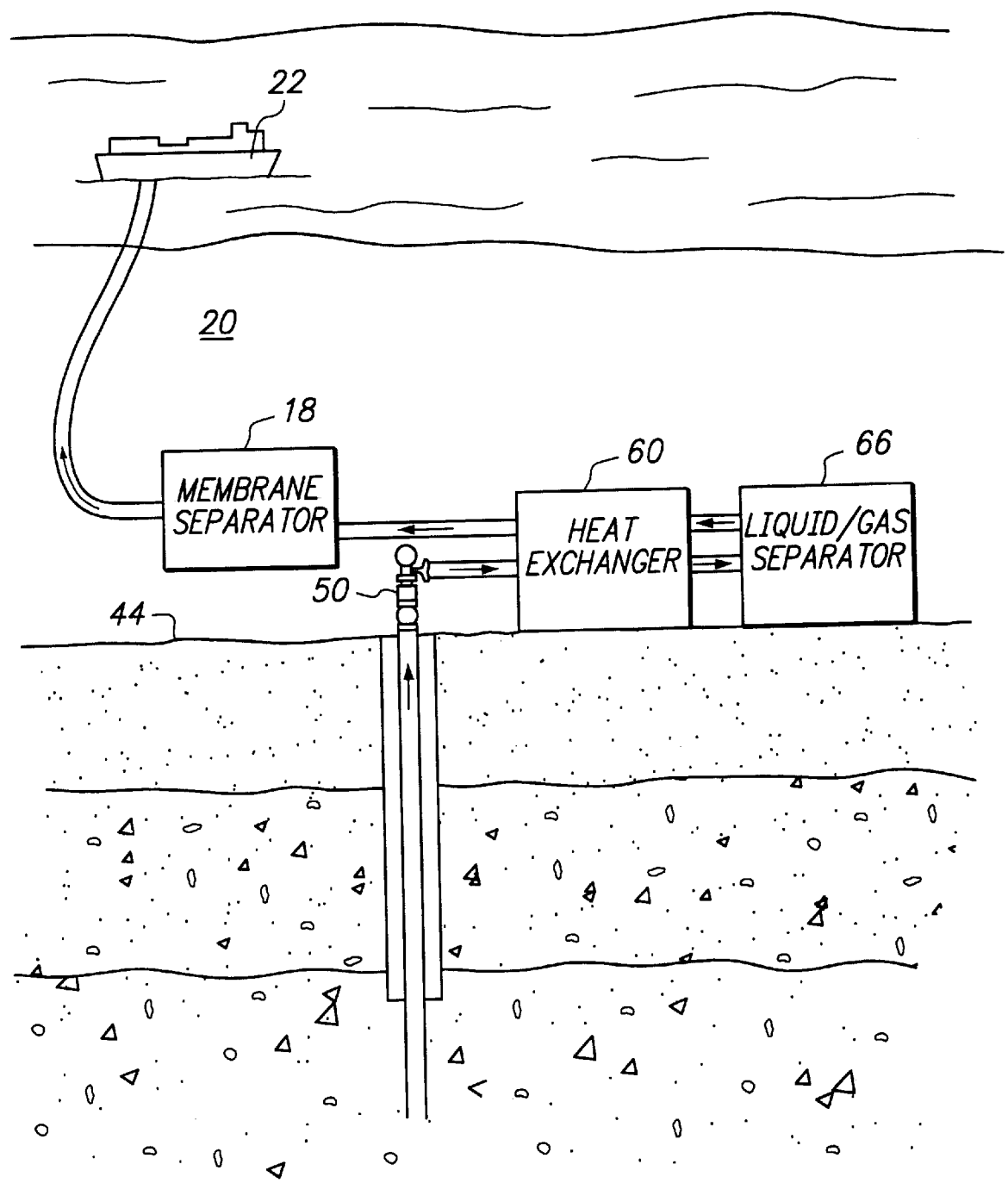
FIG. 6 is a schematic side cross-sectional view of another embodiment of a sea floor membrane separation system with temperature control showing a heat exchange element and a gas/liquid separator according to the present invention.

According to a further embodiment as shown in FIG. 6, the hydrocarbons and contaminants enter the production string 12 and flow into a heat-exchange element 60 located on the sea floor 44. The mixture of hydrocarbons and contaminants are cooled in the heat-exchange element 60 and then enter a gas/liquid separator 66. The gas/liquid separator 66 may be any of the various known separators, including a centrifugal or a hydrocyclone separator, a multi-stage structure including both dynamic and static separating elements, or a gas and liquid membrane separator wherein the separator removes at least one contaminant from the hydrocarbon and contaminant mixture. The remaining hydrocarbon and contaminants then pass back through the heat-exchange element 60 once again where the temperature of the hydrocarbon and contaminants is changed to a predetermined temperature before the mixture flows into the membrane separator 18, where at least one contaminant is removed.

Figure 7:
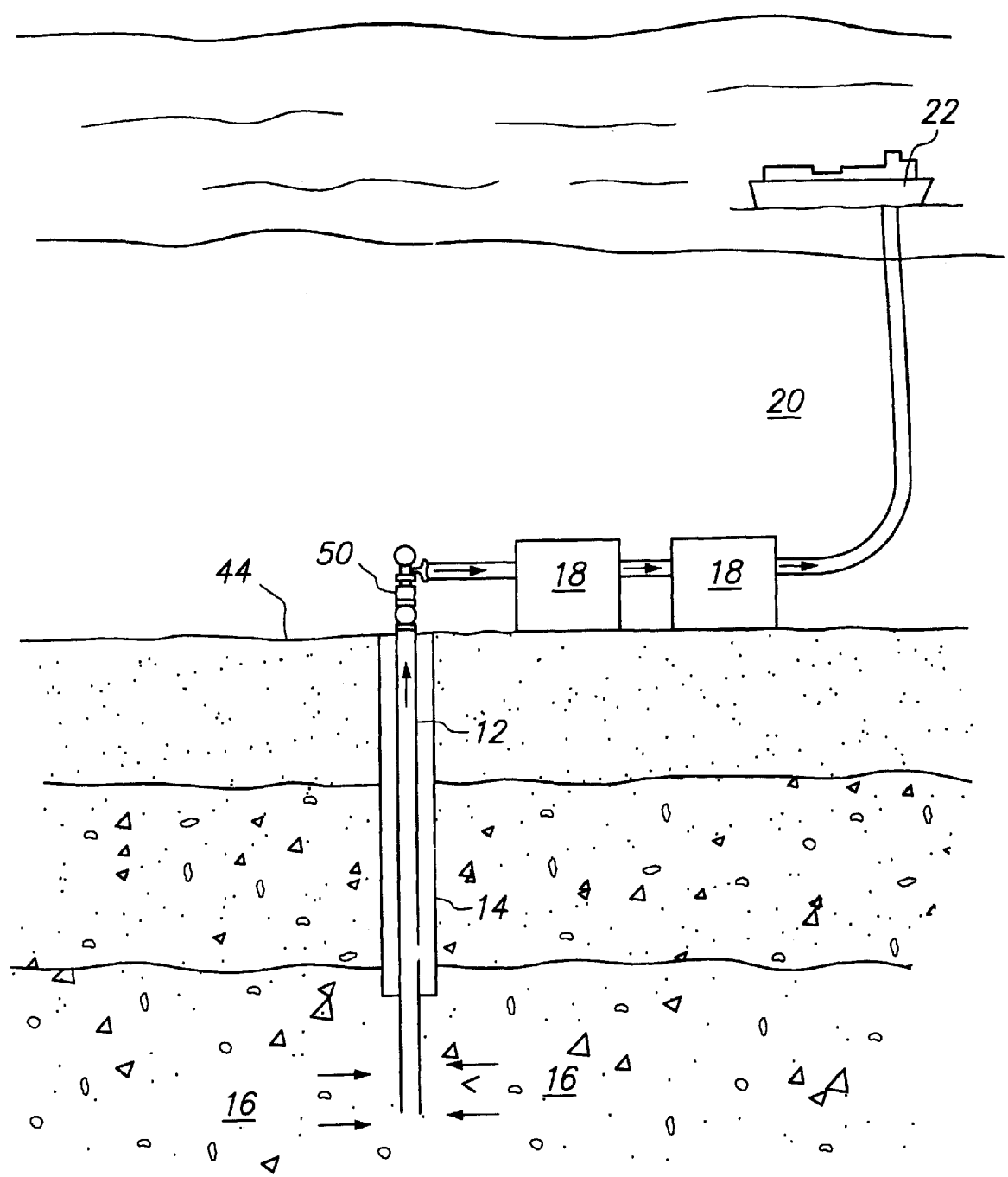
FIG. 7 is a schematic side cross-sectional view of another embodiment of a sea floor membrane separation system with temperature control showing a plurality of membrane separators according to the present invention.

In another embodiment illustrated in FIG. 7, a plurality of membrane separators are positioned between the production string 12 and the hydrocarbon collection tank 22. In one embodiment the membrane separators are positioned in series. Alternatively, (not shown) the membrane separators are positioned in parallel. The location of the plurality of membrane separators 18 will remove at least one desired contaminant in combination with achieving a predetermined temperature for separation of the hydrocarbons from the contaminants.

In addition, the membrane separators can remove only gases and/or may be interspaced with liquid separation membranes for the removal of liquids. Liquid separation membranes generally function to remove a mixture of liquids and gases from a hydrocarbon stream and are termed liquid separation membranes based on their primary purpose of removing liquid based or condensed contaminants from a hydrocarbon gas stream. The removal of liquids from a gaseous mixture can greatly prolong the life of the gas separation membranes. In addition, the overall efficiency of the well is improved by reducing the amount of down time for replacement of damaged membranes.

The membrane separator 18 is located so that the temperature of the mixture of hydrocarbons and contaminants is between about 25° C. and about 100° C. when entering the membrane separator 18. This temperature is achieved by placement of the membrane separator 18 on the sea floor 44 at a location wherein an optimum temperature of the hydrocarbons and contaminants is achieved before the mixture enters the membrane separator. It can also be appreciated, that in addition to the location of the membrane separator, the optimum temperature can also be achieved through use of a heat-exchange element 60, or a combination of insulation 30, heat-exchange element 60, location of the membrane separator 18, or other device which affects the temperature of the hydrocarbons and contaminants before entering the membrane separator.

Figure 8:
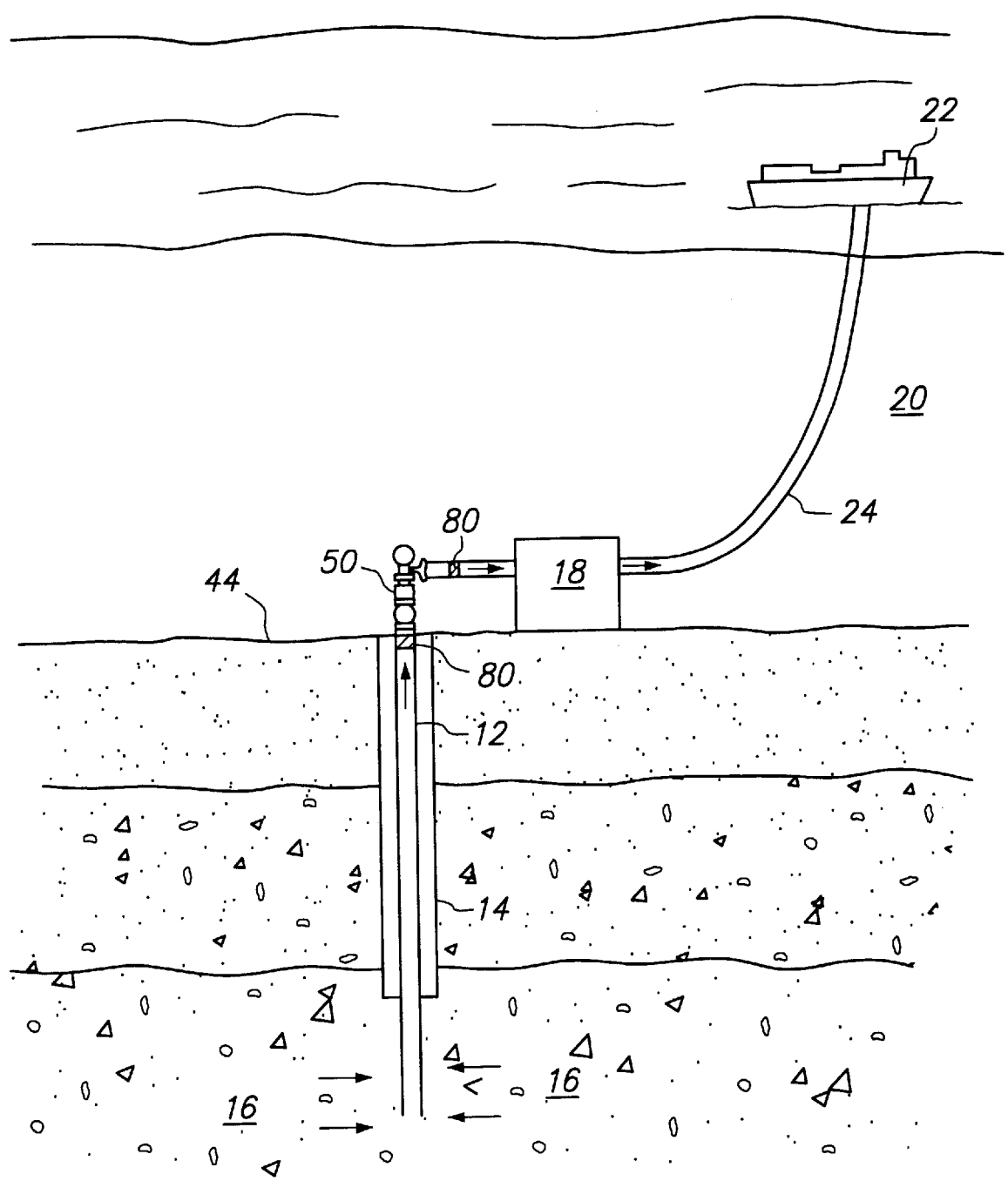
FIG. 8 is a schematic side cross-sectional view of another embodiment of a sea floor membrane separation system with temperature control showing an intelligent automated system in the production string according to the present invention.

In another embodiment, as shown in FIG. 8, an intelligent automated system 80 is placed in the production string 12 or in the tube 24 to monitor the flow of hydrocarbons and contaminants. The intelligent automated system 80 monitors and controls the flow of the hydrocarbons and contaminants before the mixture passes through the membrane separator 18, or any of the pretreatment devices including heat-exchange element 60, filter, guard bed, liquid/gas separator, cyclone separator or inverse membrane. The intelligent automated system has a sensor which monitors the pressure, temperature and flow of the hydrocarbons and contaminants in the wellbore or tube. If the intelligent automated system senses that the temperature of the hydrocarbons and contaminants is too high, the intelligent automated system 80 controls a valve to the heat-exchanger element 60 to allow more water into the heat exchanger to decrease the temperature of the hydrocarbons and contaminants. It can be appreciated that the intelligent automated system may control a series of valves or controls for adjusting the pressure, temperature flow of the hydrocarbons and contaminants.

Figure 9:
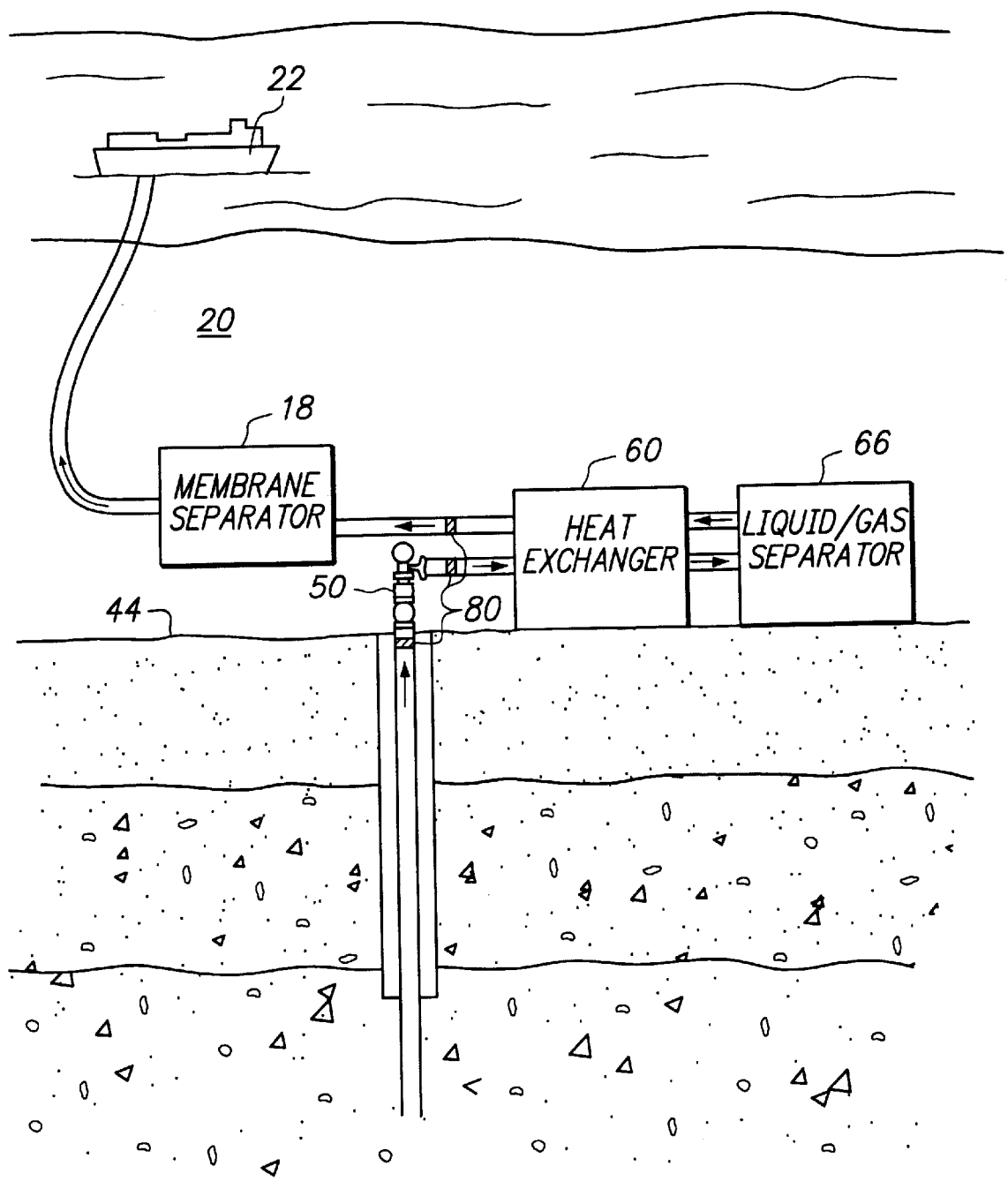
FIG. 9 is a schematic side cross-sectional view of another embodiment of a sea floor membrane separation system with temperature control showing a heat exchange element, a gas/liquid separator, and an intelligent automated system according to the present invention.

In FIG. 9, an intelligent automated system 80 is shown with a heat exchanger 60, liquid gas separator 66, and a membrane separator 18. The intelligent automated system 80 monitors the pressure and temperature of the hydrocarbons and contaminants. Accordingly, the pressure of the hydrocarbons and contaminants can be measured across a membrane separator or within the entire system, and if conditions require, the temperature of the hydrocarbons and contaminants can be increased or decreased through the heat exchanger 60, liquid/gas separator 66 or other device.

Figure 10:
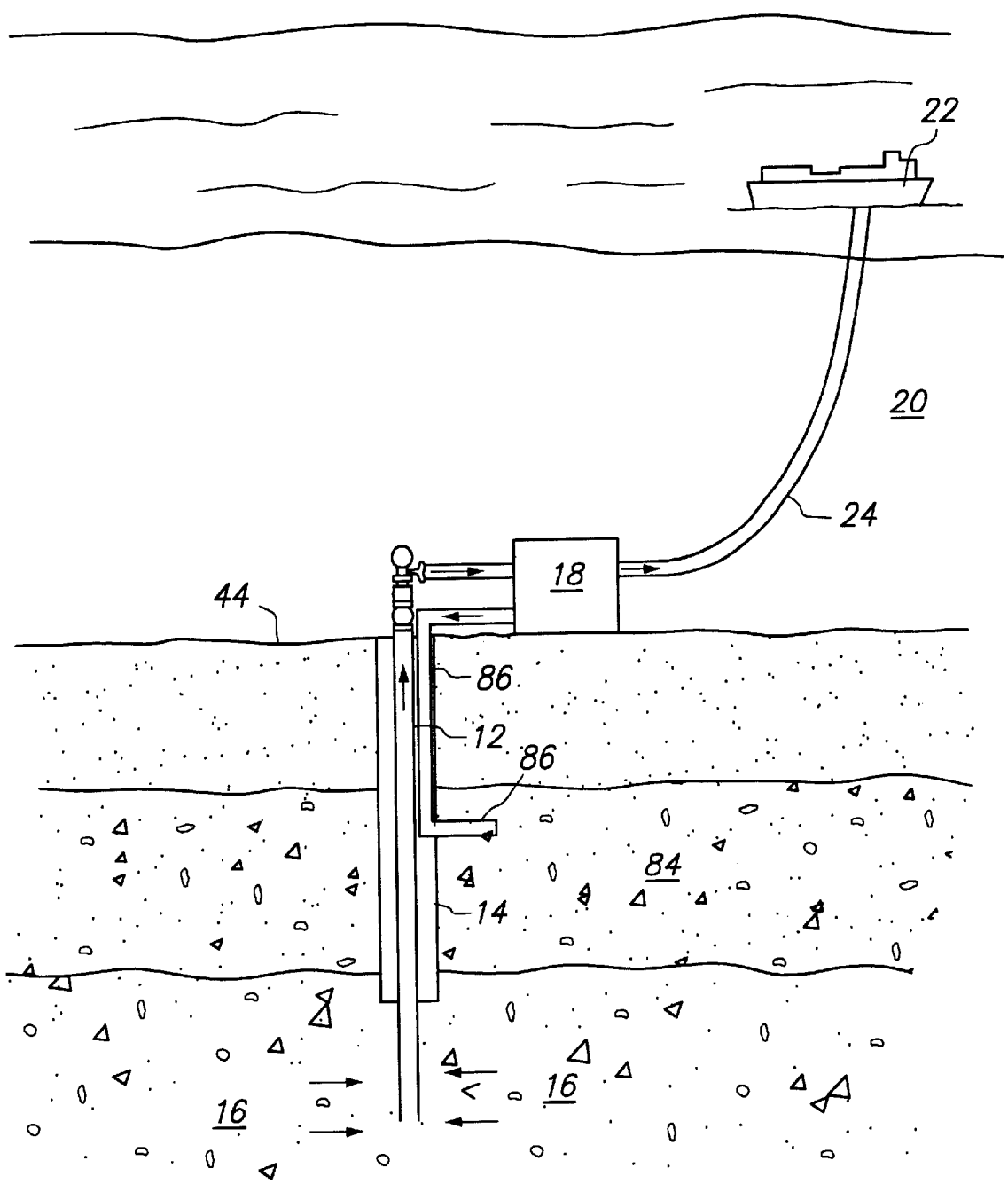
FIG. 10 is a schematic side cross-sectional view of another embodiment of a sea floor membrane separation system with temperature control with a reinjection system according to the present invention.

In an alternative embodiment, as shown in FIG. 10, at least one contaminant is removed from the hydrocarbons and contaminants by the membrane separator 18 and reinjected into a disposal formation 84 below the sea floor by pumping the contaminant through a disposal flow line 86. The location of the membrane separator 18, as in the previous embodiments, will result in the hydrocarbons and contaminants entering the membrane separator 18 at a predetermined temperature and enhancing the separation of the hydrocarbons from the contaminants.

Figure 11:
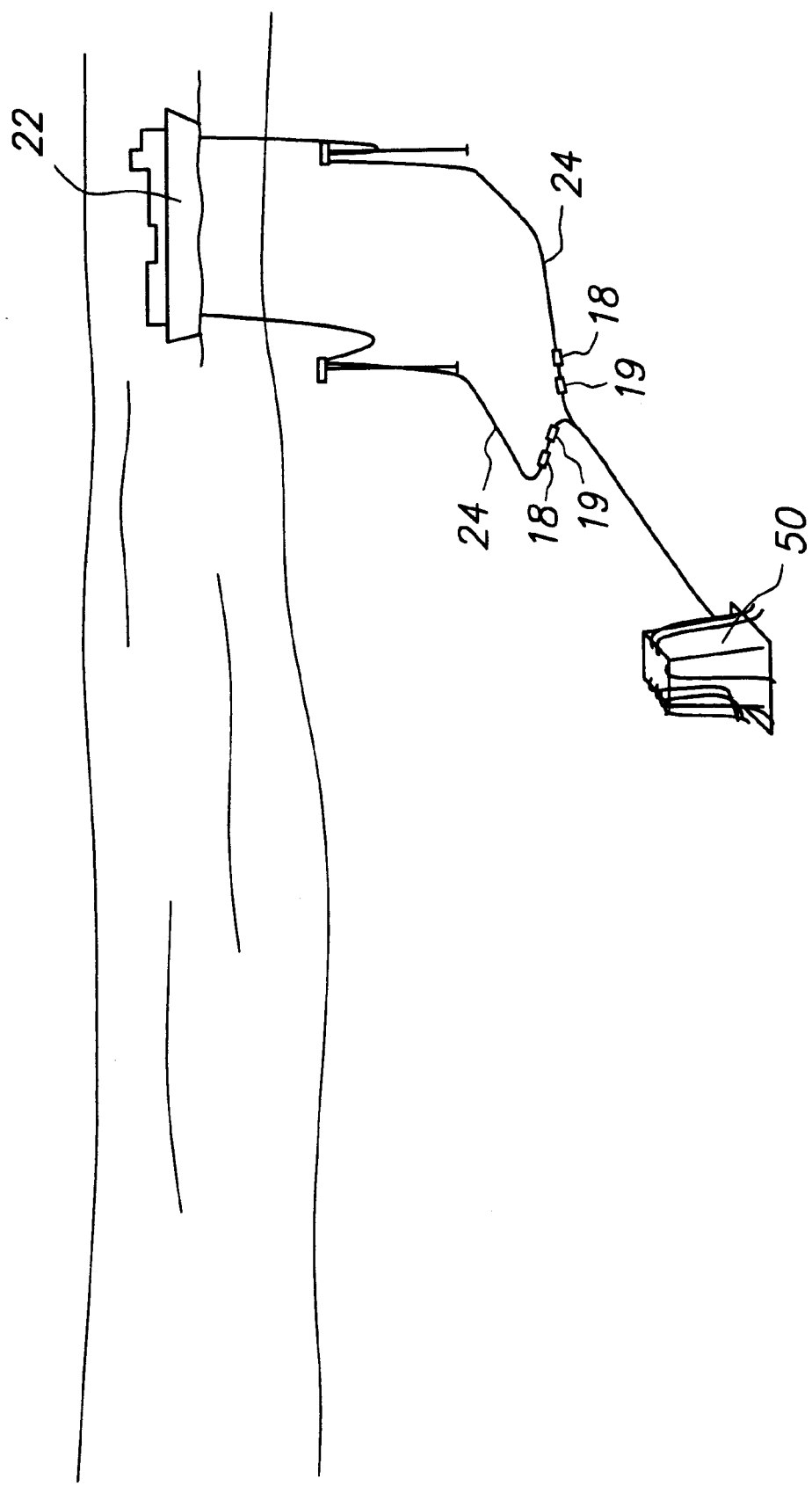
FIG. 11 is a perspective view of another embodiment of a sea floor membrane separation system with temperature control showing at least two tubes connected to a wellhead according to the present invention.

In another embodiment, as shown in FIG. 11, at least two tubes 24 are connected to the well head 50 for delivering the produced hydrocarbons and contaminants to the hydrocarbon collection tank 22. In each of the tubes 24, at least one membrane separator 18 is placed for removing at least one contaminant from the flow of hydrocarbons and contaminants. The membrane separators are fitted with a valve which diverts the flow of hydrocarbons and contaminants to one of at least two tubes 24 while the membrane separator 18 in another of the tubes 24 is serviced.

Figure 12:
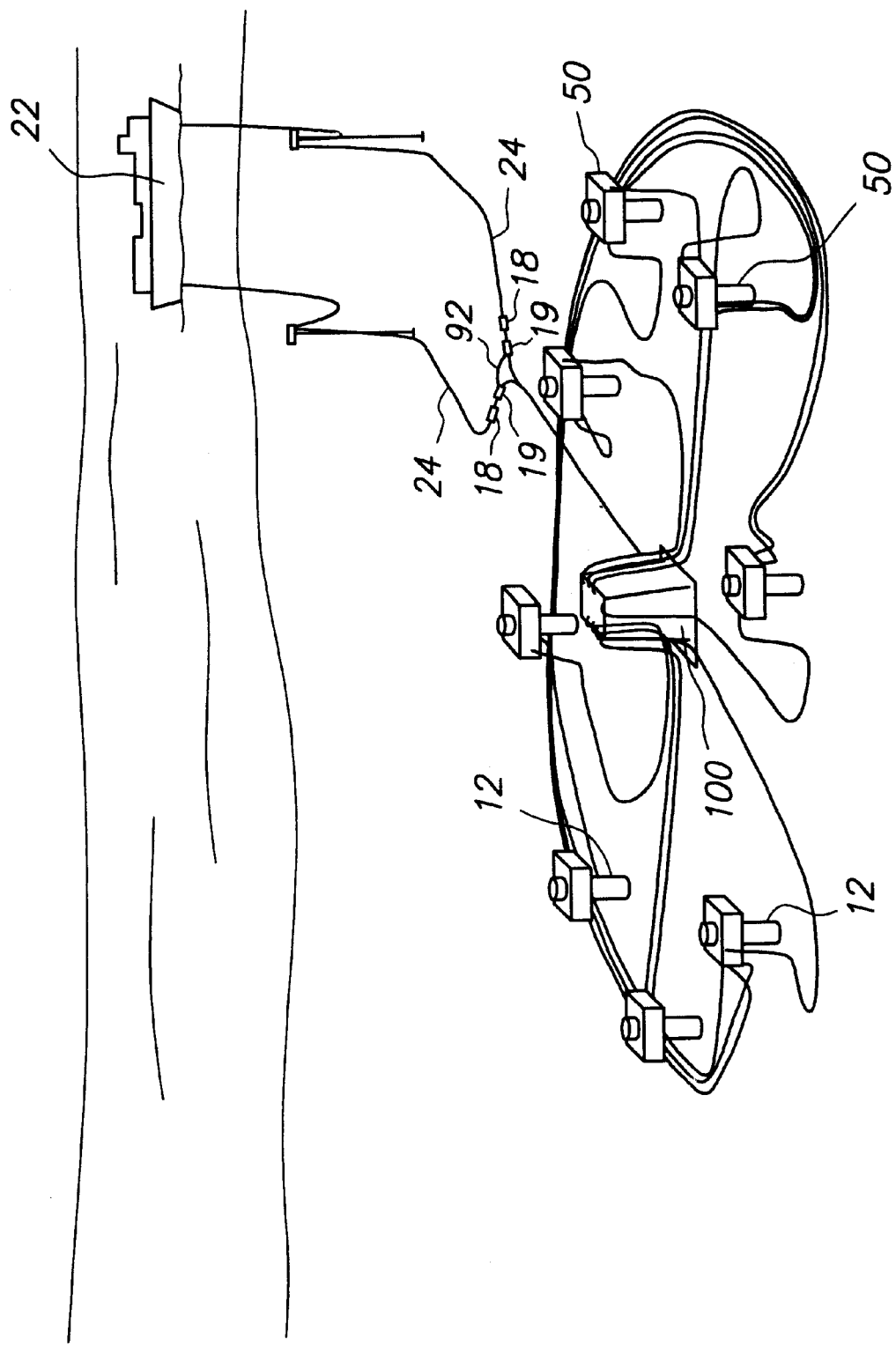
FIG. 12 is a perspective view of a sea floor membrane separation with temperature control located on the sea floor with a central gathering station according to the present invention.

In a further embodiment as illustrated in FIG. 12, at least one production string is connected to a central gathering station 100 located on the sea floor 44. The central gathering station 100 can be connected to a series of production strings 12 or well heads 50. The central gathering station 100 is connected to the hydrocarbon collection tank 22 by at least one tube 24. Alternatively, as shown in FIG. 12, at least two tubes 24 are connected to the central gathering station 100 for delivering the produced hydrocarbons and contaminants to the hydrocarbon collection tank 22. The membrane separators 18 are also connected to one another by a tube 92. The membrane separators 18 are also fitted with a valve for diverting the flow of hydrocarbons and contaminants to one of the tubes 24 while the membrane separator 18 in another of the tubes is serviced. Once again as shown in the previous embodiments, the location of the membrane separator 18 achieves a predetermined temperature for optimizing the separation of hydrocarbons and contaminants.

Figure 13:
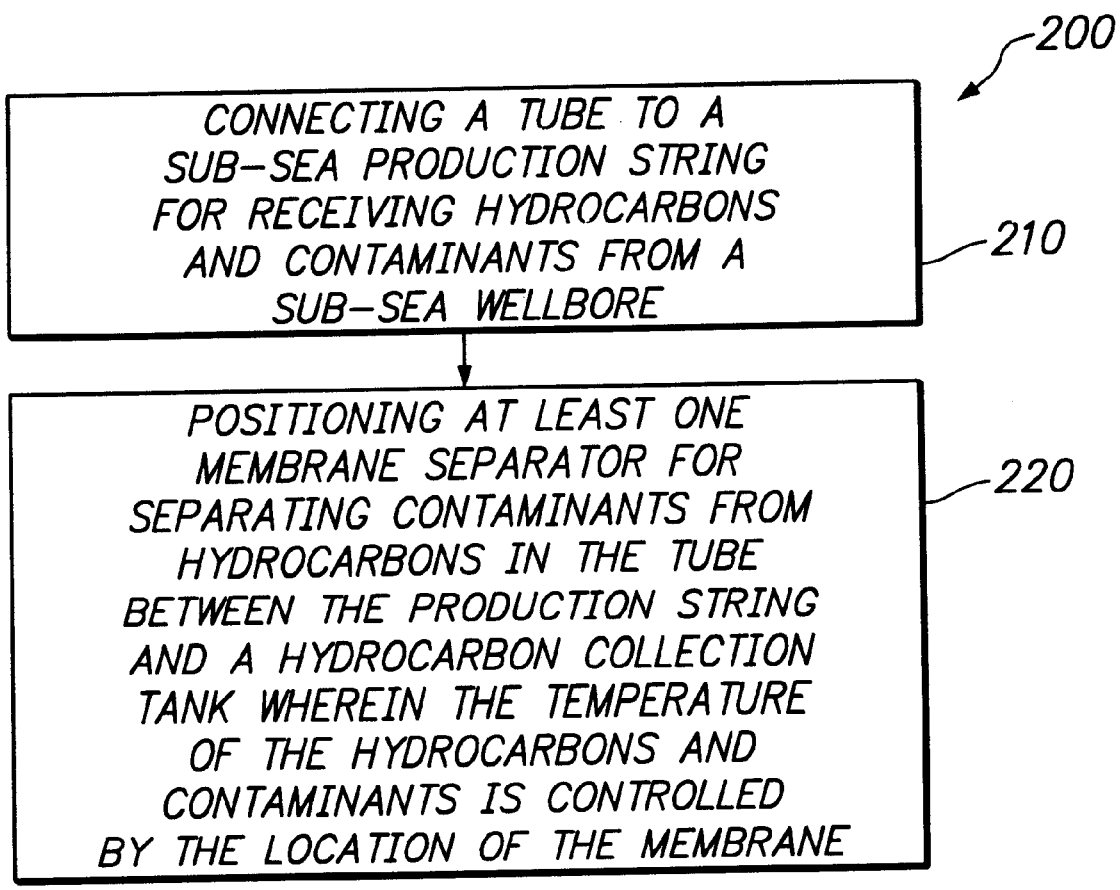
FIG. 13 is a schematic diagram of an underwater membrane separation method with temperature control according to the present invention.

In FIG. 13, an underwater membrane separation method with temperature control 200 is shown. The method includes the steps of connecting a tube to a sub-sea production string for removing hydrocarbons and contaminants from a sub-sea wellbore 210, and positioning at least one membrane separator for separating contaminants from hydrocarbons in the tube between the production string and a hydrocarbon collection tank wherein the temperature of the hydrocarbons and contaminants is controlled by the location of the membrane 220.

In operation of the membrane separators 18, when the membranes become fouled, an increase in the amount of contaminants produced will be observed indicating that the membrane should be replaced. In addition to replacement of membranes when they have become fouled, it may be desirable to replace the membrane separation system for alterations, modifications, or updates when the production of the well changes or when new oil recovery methods and technology become available.

The operation of the present invention has been illustrated and described with respect to a sub-sea environment, however, it should be understood that the invention may be employed in any body of water including lakes, seas and oceans.

The number, type, and configuration of the membranes may vary depending on a particular well. The separation system may be specifically designed for each individual well or a production zone based on the hydrocarbon and contaminants produced by the well or reservoir. It should be understood that due to the nature of membranes, the separation process is imperfect with some of the hydrocarbon passing through the membranes with the contaminants and some of the contaminants remaining in the production string. However, the imperfect membrane separation system can be used to greatly reduce the above ground or water separation required.

The present invention may be combined with existing down hole technologies from mechanical physical separation systems, such as cyclones or centrifugal separation systems. The invention may be also used for partial removal of the contaminants to reduce the burden on surface removal facilities with the remaining contaminants removed by conventional surface technologies. Some types of separated contaminants such as carbon dioxide can be injected into the productive horizon to maintain pressurization of the reservoir.

FIGS. 1–6 and 8–12, each illustrates a singular tubular membrane for purposes of illustration. However, the membrane separation systems and methods, may include multiple membranes arranged in series or parallel.

The invention has been described in detail with a reference to the preferred embodiments thereof, it will be apparent to one skilled in the art that various changes and modifications can be made and equivalence employed, without departing from the present invention.

What is claimed is:

1. An underwater membrane separation system with temperature control, the system comprising:
   a production string located in a sub-sea wellbore for removing hydrocarbons and contaminants from a sub-sea formation; and
   at least one membrane separator for separating contaminants from hydrocarbons removed from the sub-sea formation, the membrane separator located underwater between the production string and a hydrocarbon collection tank, wherein the temperature of the hydrocarbons and contaminants is controlled to a predetermined temperature by the location of the membrane.

2. The system of claim 1, wherein the membrane separator is in a tube.

3. The system of claim 2, wherein the tube is insulated.

4. The system of claim 2, wherein at least two tubes are connected to the wellhead for delivering the produced hydrocarbons and contaminants to the hydrocarbon collection tank.

5. The system of claim 4, wherein a flow of produced hydrocarbons and contaminants exiting the membrane separator is diverted to one of the tubes while the membrane separator in another of the tubes is being serviced.

6. The system of claim 1, wherein the membrane separator is located on a sea floor.

7. The system of claim 1, wherein the hydrocarbons and contaminants pass through a heat-exchange element before entering the membrane separator.

8. The system of claim 1, wherein the hydrocarbons and contaminants pass through a liquid/gas separator before entering the membrane separator.

9. The system of claim 8, wherein the temperature of the hydrocarbons and contaminants is lowered to separate at least one liquid from a gaseous mixture.

10. The system of claim 9, wherein the temperature of the gaseous mixture is changed following separation of the liquid from the gas.

11. The system of claim 1, wherein the hydrocarbons and contaminants pass through a cyclone separator before entering the membrane separator.

12. The system of claim 1, wherein a plurality of membrane separators are positioned between the production string and the hydrocarbon collection tank.

13. The system of claim 1, wherein the membrane separator is located so that the temperature of the hydrocarbons and contaminants is between about 25° C. and about 100° C. when entering the membrane separator.

14. The system of claim 1, further comprising an intelligent automated system which monitors the flow of hydrocarbons and contaminants.

15. The system of claim 14, wherein the intelligent automated system monitors the temperature of the hydrocarbons and contaminants.

16. The system of claim 14, wherein the intelligent automated system monitors the pressure of the hydrocarbons and contaminants.

17. The system of claim 14, wherein the intelligent automated system controls the opening and closing of a valve.

18. The system of claim 1, wherein at least one contaminant is removed from the hydrocarbons by the membrane separator and injected into a disposal formation.

19. The system of claim 1, wherein at least one production string is connected to a central gathering station, which is connected to the hydrocarbon collection tank by at least one tube.

20. The system of claim 19, wherein at least two tubes are connected to the cental gathering station for delivering the produced hydrocarbons and contaminants to the hydrocarbon collection tank.

21. The system of claim 20, wherein a flow of produced hydrocarbons and contaminants exiting the membrane separator is diverted to one of the tubes while the membrane separator in another of the tubes is being serviced.

22. An underwater membrane separation method with temperature control, the method comprising:
   connecting a tube to a sub-sea production string for removing hydrocarbons and contaminants from a sub-sea wellbore; and
   positioning at least one membrane separator for separating contaminants from hydrocarbons in the tube between the production string and a hydrocarbon collection tank wherein the temperature of the hydrocarbons and contaminants is controlled by the location of the membrane.

23. The method of claim 22, further comprising the step of positioning the membrane separator in the tube before the tube is connected to the sub-sea production string.

24. The method of claim 22, further comprising the step of positioning the membrane separator in the tube after the tube is connected to the sub-sea production string.

25. The method of claim 22, further comprising the step of connecting the production string to a well head on the sea floor.

26. The method of claim 22, wherein the tube is insulated.

27. The method of claim 22, wherein the membrane separator is located on the sea floor.

28. The method of claim 22, further comprising the step of passing the hydrocarbons and contaminants through a heat-exchange element before entering the membrane separator.

29. The method of claim 22, further comprising the step of passing the hydrocarbons and contaminants through a liquid/gas separator before entering the membrane separator.

30. The method of claim 22, further comprising the step of passing the hydrocarbons and contaminants through a cyclone separator before entering the membrane separator.

31. The method of claim 22, further comprising the step of positioning a plurality of membrane separators are positioned between the sub-sea production string and the hydrocarbon collection tank.

32. The method of claim 22, wherein the membrane separator so that the temperature of the hydrocarbons and contaminants is between about 25° C. and about 100° C. when entering the membrane separator.

33. The method of claim 22, wherein at least two tubes are connected to the sub-sea production string for delivering the produced hydrocarbons and contaminants to the hydrocarbon collection tank.

34. The method of claim 33, further comprising the step of diverting a flow of produced hydrocarbons and contaminants exiting the membrane separator to one of the tubes while the membrane separator in another of the tubes is being serviced.

35. The method of claim 22, further comprising the step of positioning an intelligent automated system in the tube to monitor the flow of hydrocarbons and contaminants.

36. The method of claim 22, further comprising the step of removing at least one contaminant from the hydrocarbons and contaminants by the membrane separator and injecting into a disposal formation.

37. The method of claim 22, further comprising at least one well head connected to the sub-sea wellbore, the at least one sub-sea wellbore connected to a central gathering station.

38. The method of claim 37, wherein the central gathering station is connected to the hydrocarbon collection tank by at least one tube.

39. The method of claim 38, further comprising the step of connecting at least two tubes to the central gathering station for delivering the produced hydrocarbons and contaminants to the hydrocarbon collection tank.

40. The method of claim 39, further comprising the step of diverting a flow of produced hydrocarbons and contaminants exiting the membrane separator to one of the tubes while the membrane separator in another of the tubes is being serviced.

41. The method of claim 22, further comprising the step of lowering the temperature of the hydrocarbons and contaminants to separate at least one liquid from a gaseous mixture.

42. The method of claim 41, further comprising the step of changing the temperature of the gaseous mixture is changed following separation of the liquid from the gas.

43. A method of controlling a temperature of a production stream of hydrocarbons and contaminants to prevent degradation of a preferentially selective material, the method comprising the steps of positioning the preferentially selective material underwater at a location selected to achieve a predetermined temperature of the hydrocarbons and contaminants contacting the preferentially selective material.

* * * * *